United States Patent
Cheng et al.

(10) Patent No.: US 10,681,679 B1
(45) Date of Patent: Jun. 9, 2020

(54) RESOURCE UNIT DETECTION IN HIGH-EFFICIENCY WIRELESS SYSTEM

(71) Applicant: NXP USA, Inc., Austin, TX (US)

(72) Inventors: Xilin Cheng, Menlo Park, CA (US); Bo Yu, San Jose, CA (US); Xiayu Zheng, San Jose, CA (US)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 16/005,103

(22) Filed: Jun. 11, 2018

Related U.S. Application Data

(60) Provisional application No. 62/523,166, filed on Jun. 21, 2017.

(51) Int. Cl.
*H04W 72/04* (2009.01)
*H04W 84/12* (2009.01)
*H04B 17/318* (2015.01)

(52) U.S. Cl.
CPC .......... *H04W 72/04* (2013.01); *H04B 17/318* (2015.01); *H04W 84/12* (2013.01)

(58) Field of Classification Search
CPC ..... H04W 72/04; H04W 84/12; H04B 17/318
See application file for complete search history.

(56) References Cited

U.S. PATENT DOCUMENTS

| | | | | |
|---|---|---|---|---|
| 5,199,078 | A * | 3/1993 | Orglmeister | H04B 1/667 381/106 |
| 7,260,054 | B2 * | 8/2007 | Olszewski | H04L 1/20 370/208 |
| 8,451,918 | B1 * | 5/2013 | Cheng | H04K 3/228 370/208 |
| 8,503,950 | B1 * | 8/2013 | Dick | H04B 1/0475 375/295 |
| 2003/0012126 | A1 * | 1/2003 | Sudo | H04L 1/1692 370/203 |
| 2006/0126490 | A1 * | 6/2006 | Hagen | H04L 27/261 370/208 |
| 2009/0312008 | A1 * | 12/2009 | Lindoff | H04L 25/022 455/423 |
| 2012/0307649 | A1 * | 12/2012 | Park | H04B 7/0413 370/241 |

(Continued)

*Primary Examiner* — Andrew Lai
*Assistant Examiner* — Harry H Kim

(57) ABSTRACT

A method for identifying active resource units in a high-efficiency wireless system includes quantizing phase angles of samples received in a high-efficiency short training field of a transmission, performing a transform operation on quantized phase angle samples to derive transmitted power, comparing transmitted power of an individual resource unit as determined from transformed quantized phase angle samples to transmitted power of other resource units as determined from transformed quantized phase angle samples, and identifying, as active, resource units whose transmitted power, as determined from transformed quantized phase angle samples, bears a first predetermined relationship to transmitted power of the other resource units. Transmitted power of a resource unit may be compared to the total transmitted power of all resource units, or to the transmitted power of one of the other resource units whose transmitted power is a maximum transmitted power of all resource units. A receiver may implement the method.

22 Claims, 10 Drawing Sheets

(56) References Cited

U.S. PATENT DOCUMENTS

| | | | |
|---|---|---|---|
| 2015/0003632 A1* | 1/2015 | Thesing | G10L 21/0388 381/98 |
| 2016/0204960 A1* | 7/2016 | Yu | H04B 7/0417 370/338 |
| 2018/0199375 A1* | 7/2018 | Nezou | H04W 74/006 |

* cited by examiner

RESOURCE UNIT DETECTION IN HIGH-EFFICIENCY WIRELESS SYSTEM

CROSS REFERENCE TO RELATED APPLICATION

This claims the benefit of commonly-assigned U.S. Provisional Patent Application No. 62/523,166, filed Jun. 21, 2017, which is hereby incorporated by reference herein in its entirety.

FIELD OF USE

This disclosure relates to detection, in a high-efficiency wireless system, of which allocated resource units are active.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted to be prior art against the present disclosure.

In high-efficiency wireless systems, such as those operating under the IEEE 802.11ax standard, an access point will send a trigger frame soliciting users, or stations, to identify themselves so that bandwidth resource units can be allocated. However, not all stations to whom the trigger frame is addressed respond to the trigger frame.

SUMMARY

A first method according to implementations of the subject matter of this disclosure, for identifying active resource units in a high-efficiency wireless system, includes quantizing phase angle samples received in a high-efficiency short training field of a transmission, performing a transform operation on quantized phase angle samples to derive transmitted power, comparing transmitted power of an individual resource unit as determined from transformed quantized phase angle samples to transmitted power of other resource units as determined from transformed quantized phase angle samples, and identifying, as active, resource units whose transmitted power, as determined from transformed quantized phase angle samples, bears a first predetermined relationship to transmitted power of the other resource units.

In one implementation of the first method, the comparing transmitted power of the individual resource unit as determined from transformed quantized phase angle samples to transmitted power of other resource units as determined from transformed quantized phase angle samples may include comparing the transmitted power of the individual resource unit to the total transmitted power of all resource units. In such an implementation, the identifying, as active, resource units whose transmitted power, as determined from transformed quantized phase angle samples, bears the first predetermined relationship to transmitted power of the other resource units, may include identifying, as active, resource units whose transmitted power exceeds a predetermined fraction of the total transmitted power of all resource units.

In another implementation of the first method, the comparing transmitted power of an individual resource unit as determined from transformed quantized phase angle samples to transmitted power of other resource units as determined from transformed quantized phase angle samples may include comparing the transmitted power of the individual resource unit to the transmitted power of a particular one of the other resource units. In a first variant of such another implementation, the comparing transmitted power of an individual resource unit as determined from transformed quantized phase angle samples to transmitted power of other resource units as determined from transformed quantized phase angle samples may include comparing the transmitted power of the individual resource unit to the transmitted power of one of the other resource units whose transmitted power is a maximum transmitted power of all resource units.

In that first variant of such another implementation, the comparing the transmitted power of the individual resource unit to the transmitted power of one of the other resource units whose transmitted power is a maximum transmitted power of all resource units, may include determining a difference between the transmitted power of the one of the other resource units whose transmitted power is the maximum transmitted power of all resource units, and the transmitted power of the individual resource unit, and the identifying, as active, resource units whose transmitted power, as determined from transformed quantized phase angle samples, bears the first predetermined relationship to transmitted power of the other resource units, may include identifying, as active, resource units for which the difference at most equals a threshold.

In that first variant of such another implementation, the identifying, as active, resource units whose transmitted power, as determined from transformed quantized phase angle samples, bears the first predetermined relationship to transmitted power of the other resource units, may include identifying, as active, resource units whose transmitted power, as determined from transformed quantized phase angle samples, exceeds a predetermined fraction of the transmitted power of the one of the other resource units whose transmitted power is the maximum transmitted power of all resource units.

Yet another implementation of the first method further includes identifying, as inactive, resource units whose transmitted power, as determined from transformed quantized phase angle samples, bears a second predetermined relationship to transmitted power of the other resource units, and deactivating operations on resource units that have been identified as inactive.

In that yet another implementation of the first method, the comparing transmitted power of an individual resource unit as determined from transformed quantized phase angle samples to transmitted power of other resource units as determined from transformed quantized phase angle samples may include comparing the transmitted power of the individual resource unit to the total transmitted power of all resource units, and the identifying, as inactive, resource units whose transmitted power, as determined from transformed quantized phase angle samples, bears the second predetermined relationship to transmitted power of the other resource units, may include identifying, as inactive, resource units whose transmitted power at most equals a predetermined fraction of the total transmitted power of all resource units.

In that yet another implementation of the first method, the comparing transmitted power of an individual resource unit as determined from transformed quantized phase angle samples to transmitted power of other resource units as determined from transformed quantized phase angle samples may include comparing the transmitted power of the individual resource unit to the transmitted power of a particular one of the other resource units whose transmitted power is a maximum transmitted power of all resource units, and the identifying, as inactive, resource units whose transmitted power, as determined from transformed quantized phase angle samples, bears the second predetermined relationship to transmitted power of the other resource units, may include identifying, as inactive, resource units whose transmitted power bears the second predetermined relationship to the transmitted power of the particular one of the other resource units whose transmitted power is a maximum transmitted power of all resource units.

In such an implementation, the comparing the transmitted power of the individual resource unit to the transmitted power of the particular one of the other resource units whose transmitted power is a maximum transmitted power of all resource units may include determining a difference between the transmitted power of the one of the other resource units whose transmitted power is the maximum transmitted power of all resource units, and the transmitted power of the individual resource unit, and the identifying, as inactive, resource units whose transmitted power, as determined from transformed quantized phase angle samples, bears the second predetermined relationship to transmitted power of the other resource units, may include identifying, as inactive, resource units for which the difference exceeds a threshold.

In such an implementation the identifying, as inactive, resource units whose transmitted power, as determined from transformed quantized phase angle samples, bears the second predetermined relationship to the transmitted power of the of the particular one of the other resource units whose transmitted power is a maximum transmitted power of all resource units, may include identifying, as inactive, resource units whose transmitted power at most equals a predetermined fraction of the transmitted power of the one of the other resource units whose transmitted power is the maximum transmitted power of all resource units.

According to the first method, the transmission may be a UL-OFDMA transmission. According to the first method, the transmission may be a DL-OFDMA transmission.

A first implementation of a receiver for a high-efficiency wireless system includes a controller configured to identify active resource units in the high-efficiency wireless system, by quantizing phase angle samples received in a high-efficiency short training field of a transmission, performing a transform operation on quantized phase angle samples to derive transmitted power, comparing transmitted power of an individual resource unit as determined from transformed quantized phase angle samples to transmitted power of other resource units as determined from transformed quantized phase angle samples, and identifying, as active, resource units whose transmitted power, as determined from transformed quantized phase angle samples, bears a first predetermined relationship to transmitted power of the other resource units.

In a receiver according to the first implementation, the controller may be configured to compare transmitted power of an individual resource unit as determined from transformed quantized phase angle samples to total transmitted power of all resource units as determined from transformed quantized phase angle samples. In such a receiver, the controller may be configured to identify, as active, resource units whose transmitted power, as determined from transformed quantized phase angle samples, exceeds a predetermined fraction of the total transmitted power of all resource units.

In a receiver according to the first implementation, the controller may be configured to compare transmitted power of an individual resource unit as determined from transformed quantized phase angle samples to transmitted power of a particular one of the other resource units.

In a first variant of a receiver according to the first implementation, the controller may be configured to compare transmitted power of an individual resource unit as determined from transformed quantized phase angle samples to transmitted power of one of the other resource units whose transmitted power is a maximum transmitted power of all resource units.

In the first variant, the controller may be configured to compare the transmitted power of the individual resource unit to the transmitted power of one of the other resource units whose transmitted power is a maximum transmitted power of all resource units, by determining a difference between the transmitted power of the one of the other resource units whose transmitted power is the maximum transmitted power of all resource units, and the transmitted power of the individual resource unit, and identify, as active, resource units for which the difference at most equals a threshold.

In the first variant, the controller may be configured to identify, as active, resource units whose transmitted power, as determined from transformed quantized phase angle samples, exceeds a predetermined fraction of the transmitted power of the one of the other resource units whose transmitted power is the maximum transmitted power of all resource units.

In the first implementation of a receiver, the controller may further be configured to identify, as inactive, resource units whose transmitted power, as determined from transformed quantized phase angle samples, bears a second predetermined relationship to transmitted power of the other resource units, and deactivate operations on resource units that have been identified as inactive.

BRIEF DESCRIPTION OF THE DRAWINGS

Further features of the disclosure, its nature and various advantages, will be apparent upon consideration of the following detailed description, taken in conjunction with the accompanying drawings, in which like reference characters refer to like parts throughout, and in which.

DETAILED DESCRIPTION

Figure 1:
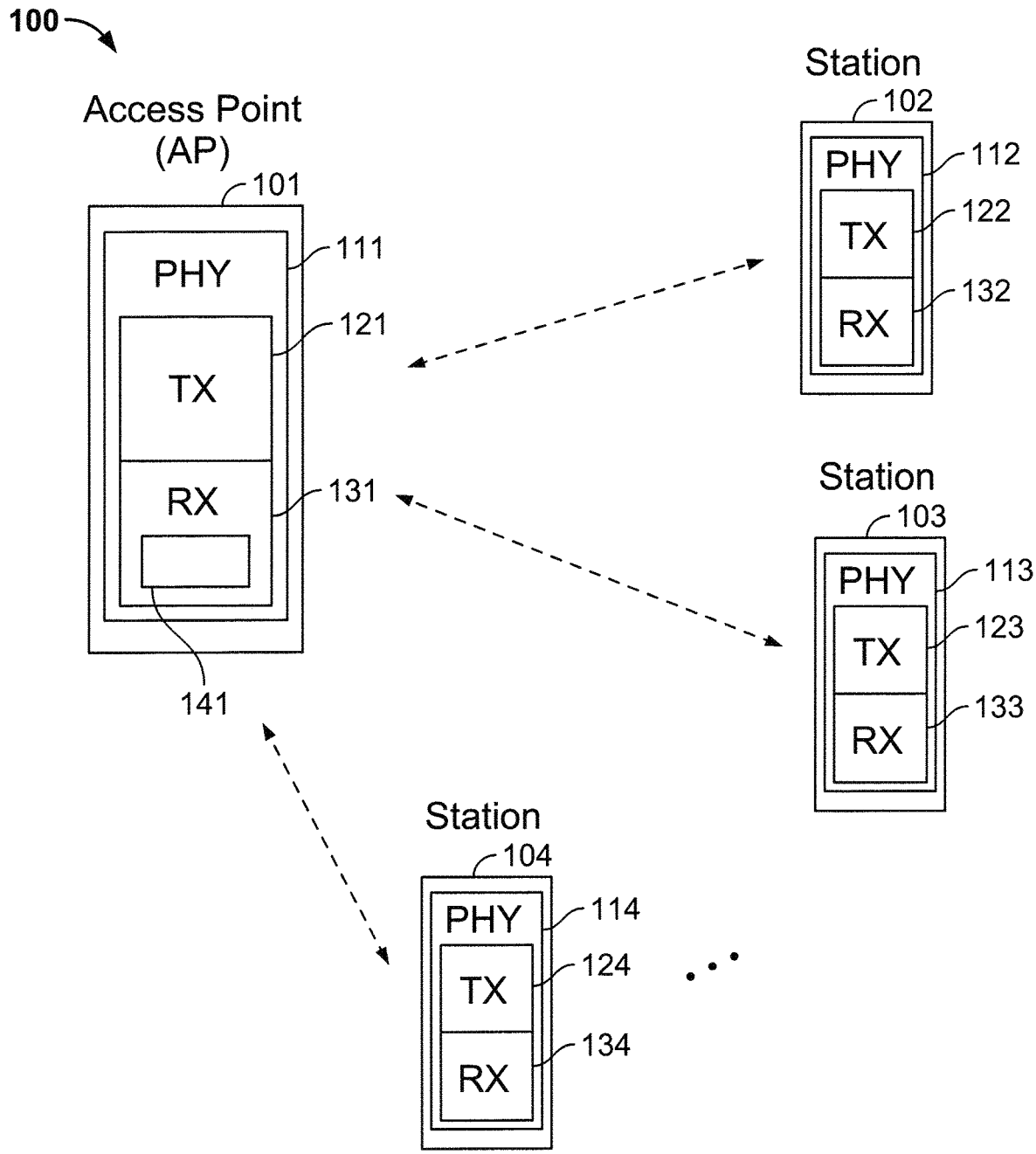
FIG. 1 is a schematic representation of a basic service set which may incorporate implementations of the subject matter of this disclosure.

When processing signals from stations in a high-efficiency (HE) wireless receiver (e.g., in an access point), a Fast Fourier Transform (FFT) is performed. The FFT output usually has limited dynamic range and precision. Therefore, proper FFT output scaling should be performed for proper performance. However, to perform proper output scaling, the number of resource units should be known.

In particular, the range of post-FFT samples can be very large, depending on signal bandwidth and receiver device bandwidth. For example, in an 80 MHz uplink orthogonal frequency-division multiple-access (UL-OFDMA) transmission, if the post-FFT samples from sixteen 52-tone resource units (RUs) have an average power per RU of P, then the post-FFT samples from eight 52-tone RUs will have an average power per RU of 2P, the post-FFT samples from four 52-tone RUs will have an average power per RU of 4P, and the post-FFT samples from a single 52-tone RU will have an average power per RU of 16P, based on Parseval's theorem:

$$\sum_{n=0}^{N_{fft}-1} |x_n|^2 = \frac{1}{N_{fft}} \sum_{k=0}^{N_{SIG}-1} |X_k|^2$$

where n is the time-domain sample index, $N_{fft}$ is the FFT size, $N_{SIG}$ is the number of subcarriers in occupied RUs, each $x_n$ is a time-domain sample, and each $X_k$ is a frequency-domain sample.

As stated above, an HE access point will send a trigger frame soliciting users, or stations, to identify themselves so that resources can be allocated. However, not all stations to whom the trigger frame is addressed respond to the trigger frame.

When a station does respond, the station responds with a trigger-based Physical Layer Convergence Procedure protocol data unit (PLCP protocol data unit, or PPDU). The number of stations that respond correlates to the number of RUs that are occupied. Based on the bandwidth of the occupied RUs, the FFT output scaling factor from the HE-LTF to the DATA field can be adjusted to conform to the FFT output range. In addition, if unoccupied RUs can be identified, operations related to those unoccupied RUs can be turned off to save power.

For example, each channel may have a certain bandwidth, which may be divided into subchannels. In one example, the channel bandwidth may be 80 MHz, while each subchannel has a bandwidth of 20 MHz (so that in this example, there are four subchannels). Any RU may occupy part or all of a single subchannel, or may even occupy more than one subchannel. In accordance with implementations of the subject matter of this disclosure, pre-HE-modulated fields (from L-STF to HE-SIGA2; see below) are transmitted only in those subchannels that contain an active RU. More generally, the number of stations that respond to a trigger frame correlates to the number of RUs that are occupied. Based on the bandwidth of the occupied RUs, the FFT output scaling factor from HE-LTF to the DATA field can be adjusted to conform to the FFT output range.

One straightforward method to scale the FFT output is to perform the FFT directly based on received time-domain samples in the HE-STF. However, automatic gain control (AGC) operation in the HE-STF may affect the detection performance, because the adaptive nature of AGC inherently affects magnitude. Therefore, the HE-STF samples may not be a reliable indicator of power.

In addition, the range of pre-FFT samples can be very large as a result of AGC operation, while in a real-world circuit implementation, the FFT input may have limited dynamic range and precision. Therefore, the FFT output may be inaccurate because of the effect of the circuit implementation on the FFT input samples. This may cause degradation in RU detection.

RU detection at the HE-STF of an OFDMA uplink in accordance with implementations of the subject matter of this disclosure operates on phase only, and thus is unaffected by AGC gain change. Therefore, changes in magnitude do not affect the result.

In accordance with implementations of the subject matter of this disclosure, the received samples in the HE-STF field are quantized into phase-only samples. An FFT operation is performed based on the quantized phase-only samples. After the FFT operation, the energy for each RU assigned in the trigger frame, as computed from the FFT output, is examined. If the FFT output for any RU bears a predetermined relationship to a certain threshold, that RU is deemed to be occupied with signal; otherwise, that RU is deemed to be unoccupied. There may be various ways of determining the threshold and the relationship to the threshold, as described below.

Quantization may be performed, for example on any Multiple Phase-Shift Keying (MPSK) modulation, including Binary PSK (BPSK or 2-PSK), Quadrature PSK (4-PSK), 8-PSK, 16-PSK, etc. An FFT operation is then performed on the quantized samples, and to check any RU, the samples attributable to the RU being examined may be compared, in some implementations, to the samples over all RUs, and in other implementations, to the power of the RU having maximum power, as described below.

FIG. 1 is a schematic representation of a basic service set (BSS) 100, including access point (AP) 101 and stations (STAs) 102, 103, 104, etc. Each station 102, 103, 104, etc. includes a physical layer transceiver (PHY) 112, 113, 114, etc., which in turn includes a transmitter (TX) 122, 123, 124, etc., and a receiver (RX) 132, 133, 134, etc. AP 101 similarly includes a PHY 111, which in turn includes a TX 121 and an RX 131. RX 131 may include processing circuitry 141 to perform the UL-OFDMA processing according to implementations of this disclosure.

Figure 2:
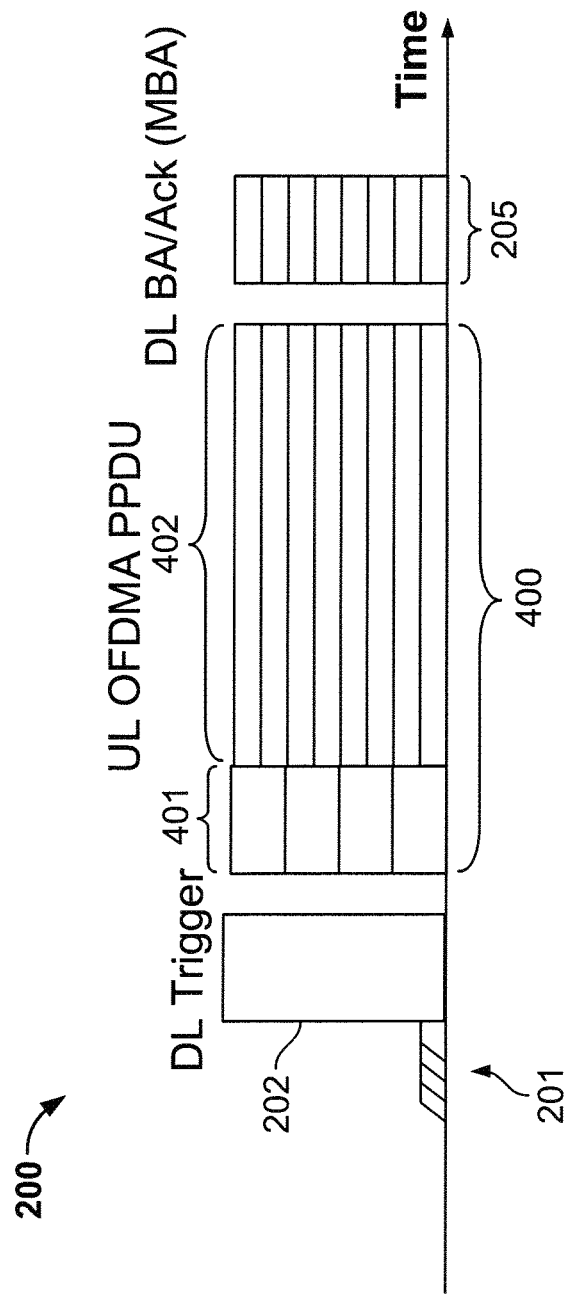
FIG. 2 is a diagrammatic representation of a basic packet exchange for setting up an OFDMA uplink in a system that may incorporate implementations of the subject matter of this disclosure.
Figure 3:
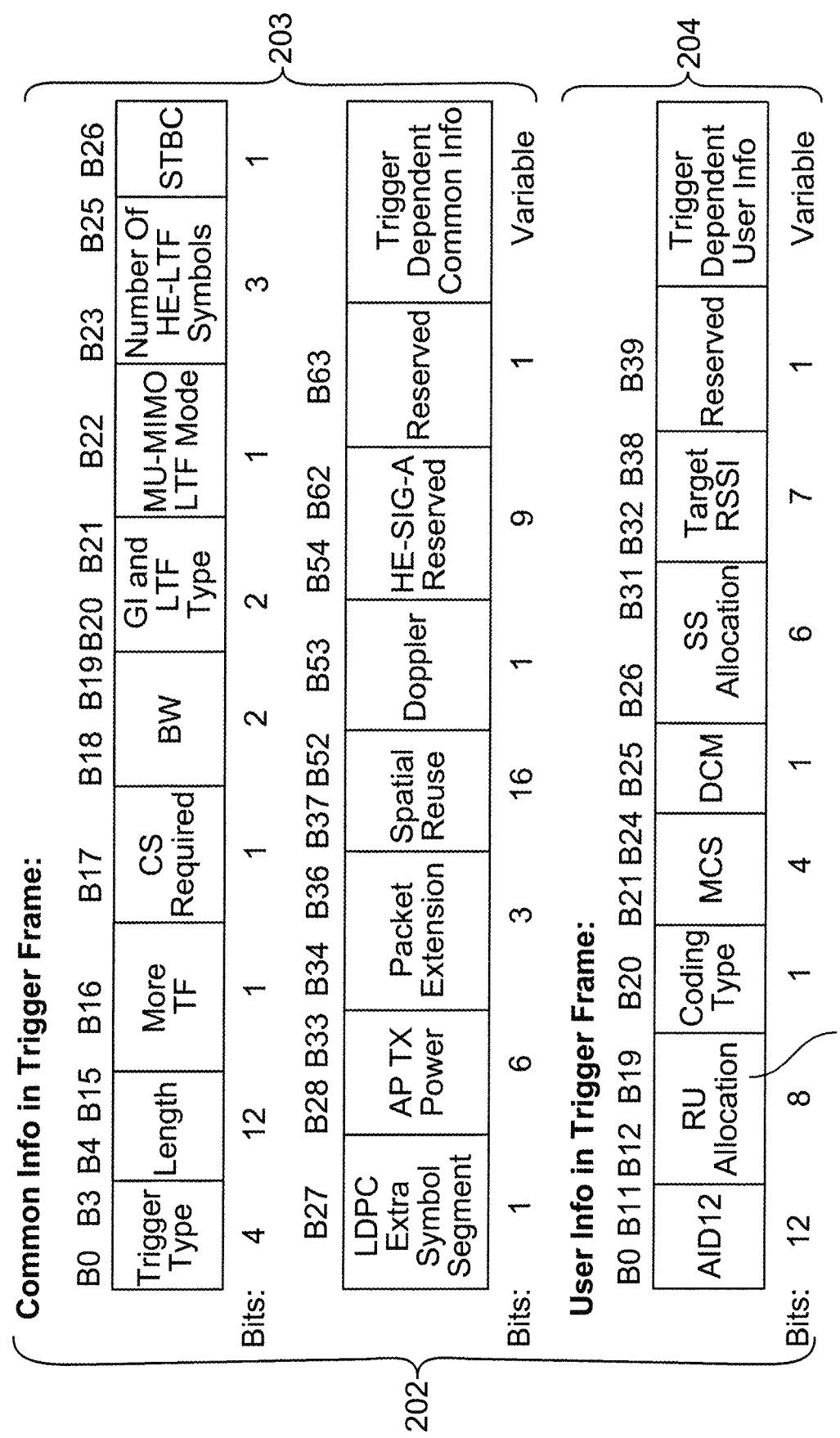
FIG. 3 is a diagram showing details of a trigger frame of FIG. 2.

FIG. 2 is a diagrammatic representation of a basic packet exchange 200 setting up a UL-OFDMA transmission. After an AP (such as AP 101) obtains channel access at 201, the AP sends out a trigger frame 202 addressed to particular stations in the BSS inviting them to participate in the uplink. As shown in more detail in FIG. 3, trigger frame 202 includes a number of fields 203 specifying to the invited stations various common parameters of the uplink, including Length, More TF, CS Required, BW, GI and LTF Type, MU-MIMO LTF Mode, Number Of HE-LTF Symbols, STBC, LDPC Extra Symbol Segment, AP TX Power, Packet Extension, Spatial Reuse, Doppler, HE-SIG-A Reserved, Reserved, and Trigger Dependent Common Info. Trigger frame 202 also includes another set of fields 204, which are repeated for each invited station and which specify various parameters for each station, including AID12, Coding Type, MCS, DCM, SS Allocation, Target RSSI, Reserved, and Trigger Dependent User Info, and, of particular interest in this disclosure, the RU allocation 214 specifying the RU (or RUs) and available bandwidth allocated to each station.

After receiving trigger frame 202, each station may respond with a PPDU 400 (see FIG. 4) including pre-HE-modulated fields 401 and at least one respective set of HE-modulated fields 402, which are acknowledged by access point 101 with a respective block acknowledgment 205. Each channel allocated to a pre-HE-modulated field for a respective station is divided into subchannels 411, which may be, e.g., 20 MHz wide. Within each set of pre-HE-modulated fields 401, each subchannel 411 includes a legacy short training field (L-STF) 421, a legacy long training field (L-LTF) 431, a legacy signal field (L-SIG) 441, a repeated legacy signal field (RL-SIG) 451, a High-Efficiency Signal Field A1 (HE-SIGA1) 461 and a High-Efficiency Signal Field A2 (HE-SIGA2) 471, which are subsequently used in processing the HE-modulated fields 402.

Figure 4:
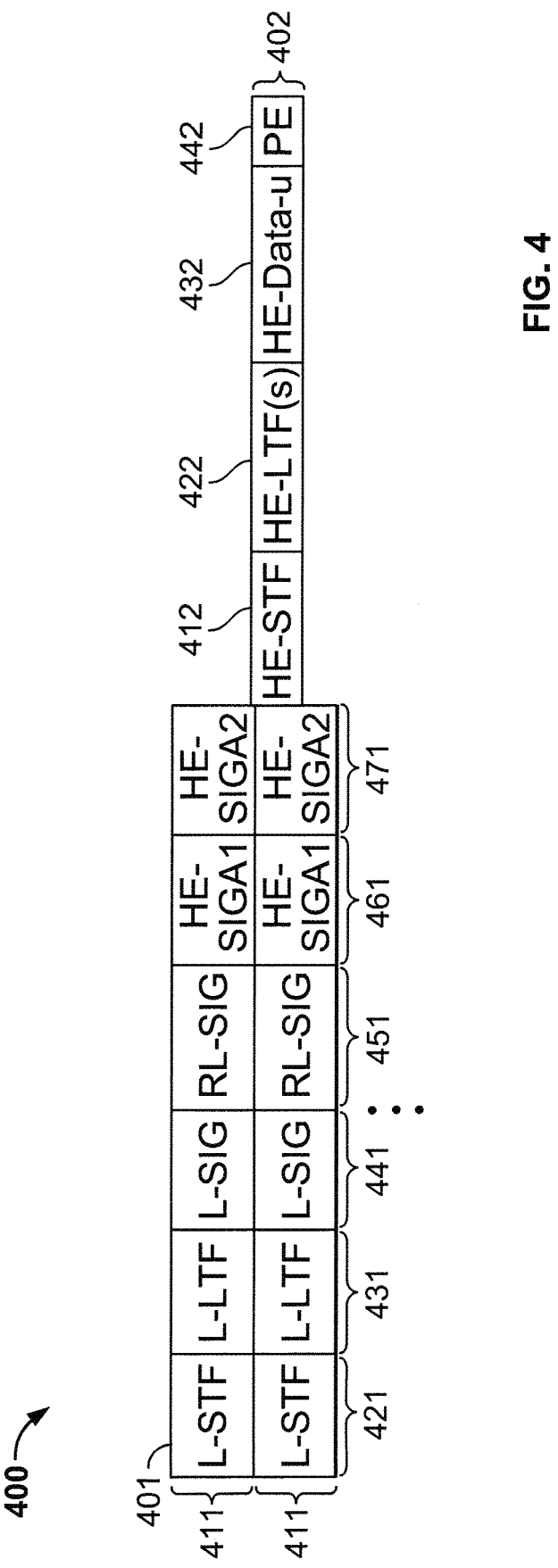
FIG. 4 is a diagram showing details of an uplink PPDU of FIG. 2.

Only subchannels containing active RUs are actually used. Therefore, the various pre-HE-modulated fields are sent only for subchannels containing active RUs. As noted above, an RU may span a subchannel 411, a portion of a subchannel 411, or more than one subchannel 411. Thus, the number of sets of HE-modulated fields 402 shown in FIG. 2 is merely an example, as the number of sets of HE-modulated fields 402 per preamble will vary depending on the number and location of RUs in use. Similarly, while FIG. 4 shows only one set of HE-modulated fields 402, which occupies parts of two different subchannels 411, the number of sets of HE-modulated fields 402, and the bandwidth of each set of HE-modulated fields 402 relative to a subchannel 411 also will vary. As seen in FIG. 4, each set of HE-modulated fields 402 includes an HE-STF field 412, one or more HE-LTF fields 422, a data field 432, and a packet extension (PE) field 442 (which provides additional receive processing time at the end of the packet so that the receiver has sufficient time for decoding).

As noted above, it is desirable to know which RUs are active. However, it is possible that there could be active stations that do not respond to the trigger frame with a PPDU. For example, there may be a station that is out of range when the trigger frame is sent but subsequently moves into range. Therefore, it is desirable to be able to determine independently which RUs are active.

Figure 5:
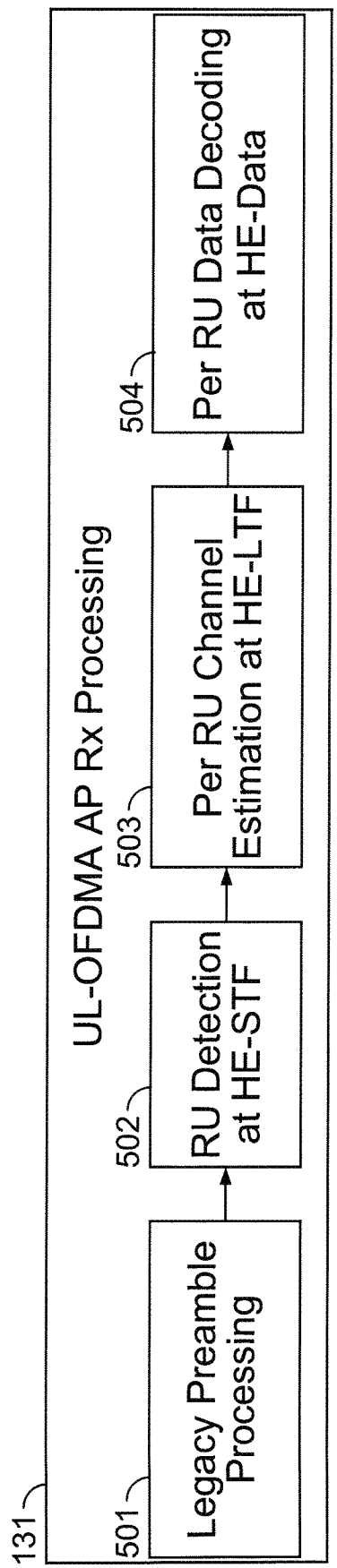
FIG. 5 is a block diagram of a receiver in accordance with implementations of the subject matter of this disclosure.

Processing circuitry 141 of RX 131 may have the structure shown in FIG. 5 for performing UL-OFDMA processing, including legacy preamble processing block 501, HE-STF RU detection block 502, HE-LTF Per-RU channel estimation block 503, and HE-DATA Per-RU data decoding block 504. Each of blocks 501-504 may include circuitry that is hard-wired to perform the respective function of the block, or may be a programmable logic device or a microcontroller or microprocessor that is programmed to perform the respective function.

Figure 6:
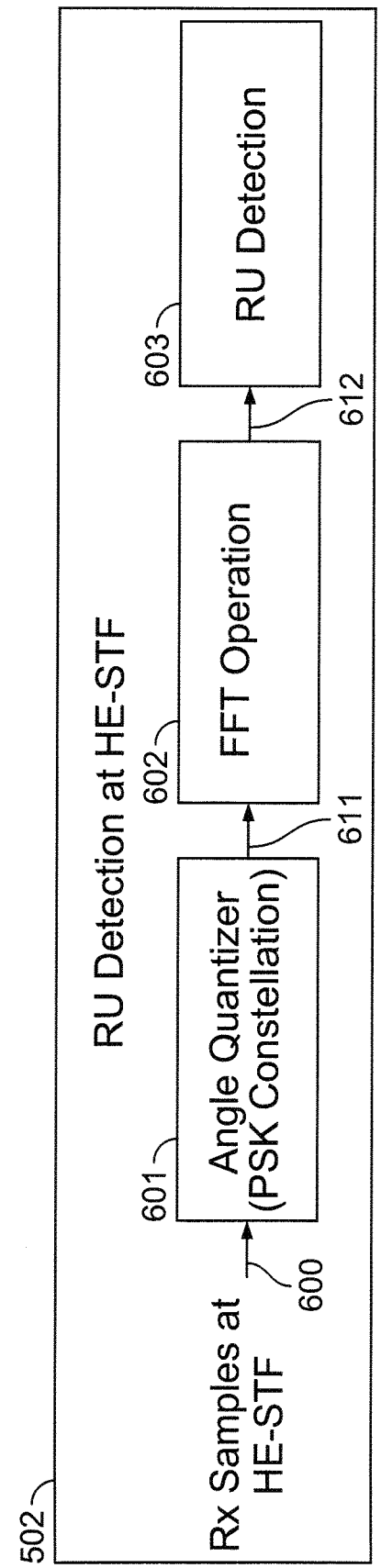
FIG. 6 is a block diagram of an implementation of a resource unit detection block of the receiver of FIG. 5, in accordance with implementations of the subject matter of this disclosure.

HE-STF RU detection block 502, in particular, may have the structure shown in FIG. 6. MPSK samples 600 are received at Angle Quantizer block 601 which derives the phase angles, as described below, for the points in the MPSK constellation. The angle-quantized samples 611 are then subjected to Fast Fourier Transform analysis in FFT Operation block 602. FFT output samples 612 are then used in RU Detection block 603 as described below. Each of blocks 601-603 may include circuitry that is hard-wired to perform the respective function of the block, or may be a programmable logic device or a microcontroller or microprocessor that is programmed to perform the respective function.

In accordance with implementations of the subject matter of this disclosure, for each waveform 402, the received samples in HE-STF field 412 are quantized into phase-only samples. An FFT is performed based on the quantized phase-only samples. The FFT output, representing energy or power, is examined for each RU assigned in the trigger frame. If the FFT output for any RU exceeds a certain threshold, that RU is deemed to be occupied with signal; otherwise, that RU is deemed to be unoccupied.

Quantization may be performed, for example on any Multiple Phase-Shift Keying (MPSK) modulation, including Binary PSK (BPSK or 2-PSK), Quadrature PSK (4-PSK), 8-PSK, 16-PSK, etc. An FFT operation is then performed on the quantized samples, and to check any RU, the samples attributable to the RU being examined may be compared, in some implementations, to the samples over all RUs, and in other implementations, to the power of the RU having maximum power.

Figure 7:
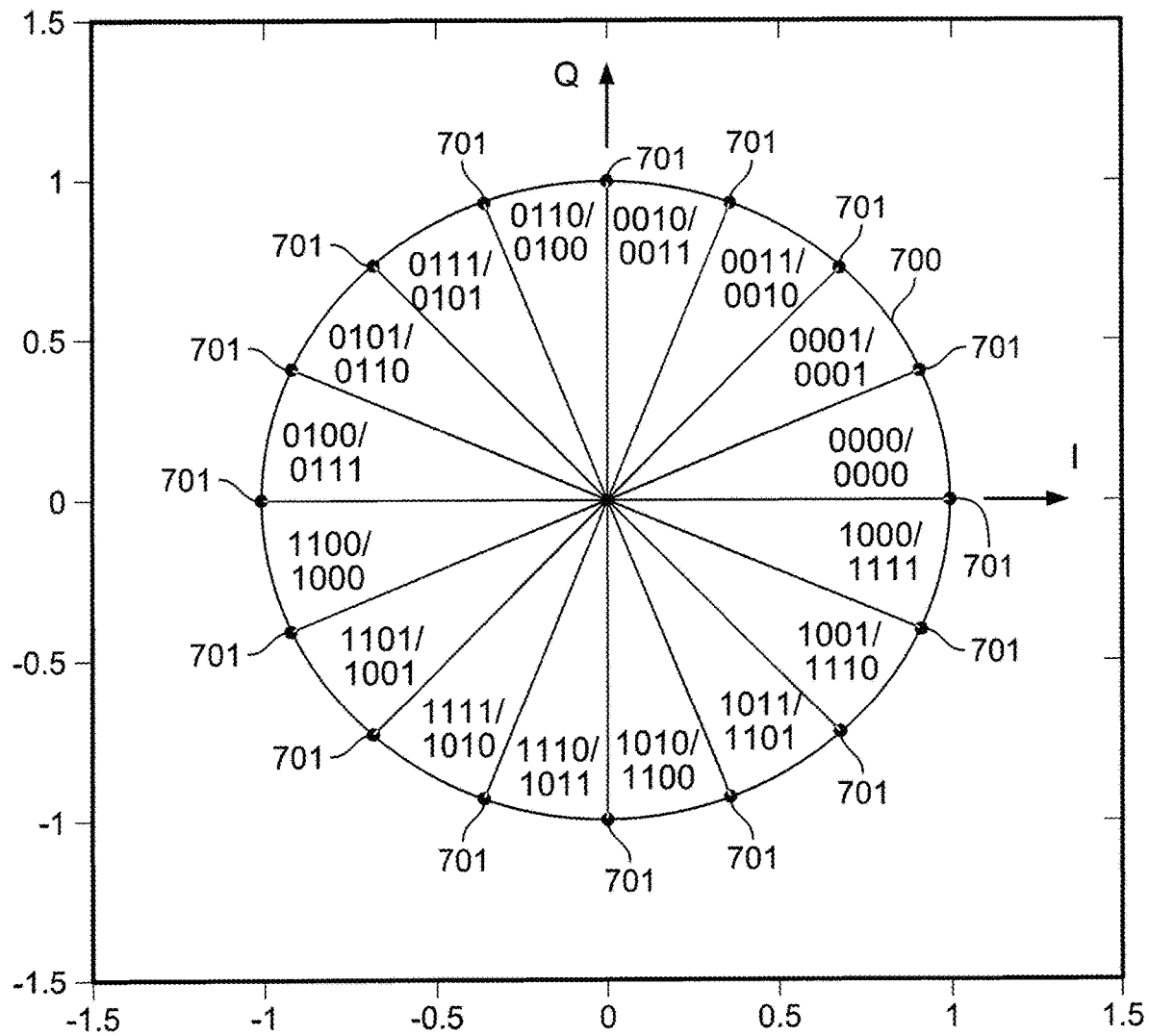
FIG. 7 is a diagram showing a four-bit 16-PSK example of quantization of phase angles in accordance with implementations of the subject matter of this disclosure.
Figure 8:
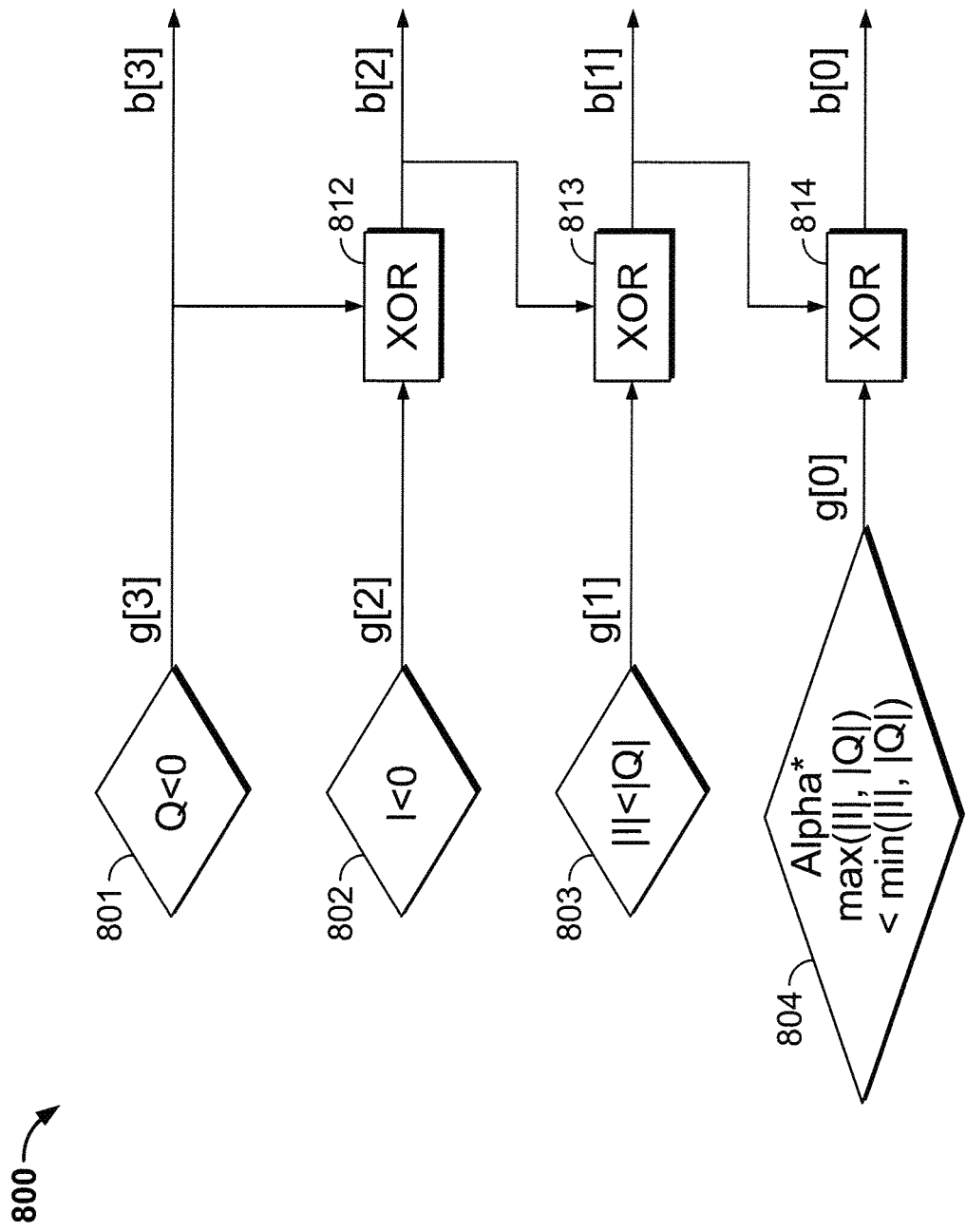
FIG. 8 is a flow diagram of a four-bit 16-PSK example of quantization of phase angles in accordance with implementations of the subject matter of this disclosure.

Angle Quantizer block 601 may quantize the samples according to any suitable quantization technique. One suitable technique, for a 16-PSK example with four bits of quantization, may be described with reference to FIGS. 7 and 8. The phase angle of a sample may be represented as the point on circle 700 specified by the values of the real (in-phase, or I) component of the sample and the complex (quadrature, or Q) component of the sample. The actual phase angle may fall anywhere on circle 700, but is quantized to the nearest one of points 701, each which may be represented by a Gray-coded value (the 4-bit number before the '/') and a binary-coded value (the 4-bit number after the '/'). The quantization may be performed, in this example, according to the method 800 diagrammed in FIG. 8.

The inputs to method 800 are the actual, unquantized values of I and Q for the sample being quantized. If Q<0, then at 801, the most-significant bit g[3] of the 4-bit Gray-coded value of the quantized angle is g[3]='1'; if Q≥0, g[3]='0'. If I<0, then at 802, the second most-significant bit g[2] of the 4-bit Gray-coded value is g[2]='1'; if I≥0, g[2]='0'. If the unsigned magnitude of I is less than the unsigned magnitude of Q (|I|<|Q|), then at 803, the second least-significant bit g[1] of the 4-bit Gray-coded value is g[1]='1'; if |I|≥|Q|, g[1]='0'. If the product of a coefficient α and the larger of the unsigned magnitudes of I and Q is less than the smaller of the unsigned magnitudes of I and Q (αmax(|I|,|Q|)<min(|I|,|Q|)), then at 804, the least-significant bit g[0] of the 4-bit Gray-coded value is g[0]='1'; if αmax(|I|,|Q|)≥min(|I|,|Q|), g[0]='0'.

The four bits of the binary-coded value of the quantized angle may then be derived, in this example, as follows:

$$b[3]=g[3]$$

$$b[2]=b[3] \text{ XOR } g[2] \tag{812}$$

$$b[1]=b[2] \text{ XOR } g[1] \tag{813}$$

$$b[0]=b[1] \text{ XOR } g[0] \tag{814}$$

The coefficient α may be determined empirically. In this example, for 4-bit quantization, α=13/32. To obtain the phase-only quantized value, a decimal value B can be derived based on b[3], b[2], b[1], and b[0], where $B=b[3]\times 10^3+b[2]\times 10^2+b[1]\times 10+b[0]$. The phase-only quantized value is $x=e^{2\pi Bj/16}$.

The quantized values are subjected to a Fast Fourier Transform operation to yield frequency-domain samples $X_k$:

$$X_k = \sum_{n=0}^{N-1} x_n e^{-\frac{2\pi jkn}{N}}$$

where n is the time-domain sample index, each $x_n$ is a quantized time-domain sample, and N is the FFT size ($0 \leq k \leq N-1$).

The total power is given by Parseval's theorem:

$$\sum_{k=0}^{N-1} |X_k|^2 = N \cdot \sum_{n=0}^{N-1} |x_n|^2$$

Because the angle quantization results in all of the $x_n$ having uniform magnitude, the total power of the FFT output is the same no matter how many RUs are occupied with signal.

According to a first method to determine whether the $r^{th}$ RU is occupied with signal (i.e., is in use), one can check whether the total power over the set of subcarriers in the $r^{th}$ RU exceeds a predetermined fraction, $\beta$, of the total power:

$$\sum_{k \in K_r} |X_k|^2 > \beta \cdot \sum_{k=0}^{N-1} |X_k|^2,$$

where $\beta$ is a threshold which can be adjusted and optimized empirically for each RU combination specified in the trigger frame, which may be a function of bandwidth (20 MHz/40 MHz/80 MHz/80+80 MHz or 160 MHz). For example, for 20 MHz bandwidth, there could be nine 26-tone RUs, or four 52-tone RUs, or two 106-tone RUs, etc. For each RU combination, an access point may have a threshold value $\beta$ which has been adjusted. $K_r$ could be the set of all subcarriers in the $r^{th}$ RU or only loaded subcarriers (i.e., subcarriers that are carrying data rather than null or guard subcarriers) in the $r^{th}$ RU. If total power over the set of subcarriers in the $r^{th}$ RU exceeds a predetermined fraction, $\beta$, of the total power, the RU of interest is considered to be active; otherwise, the RU of interest is considered to be inactive.

Figure 9:
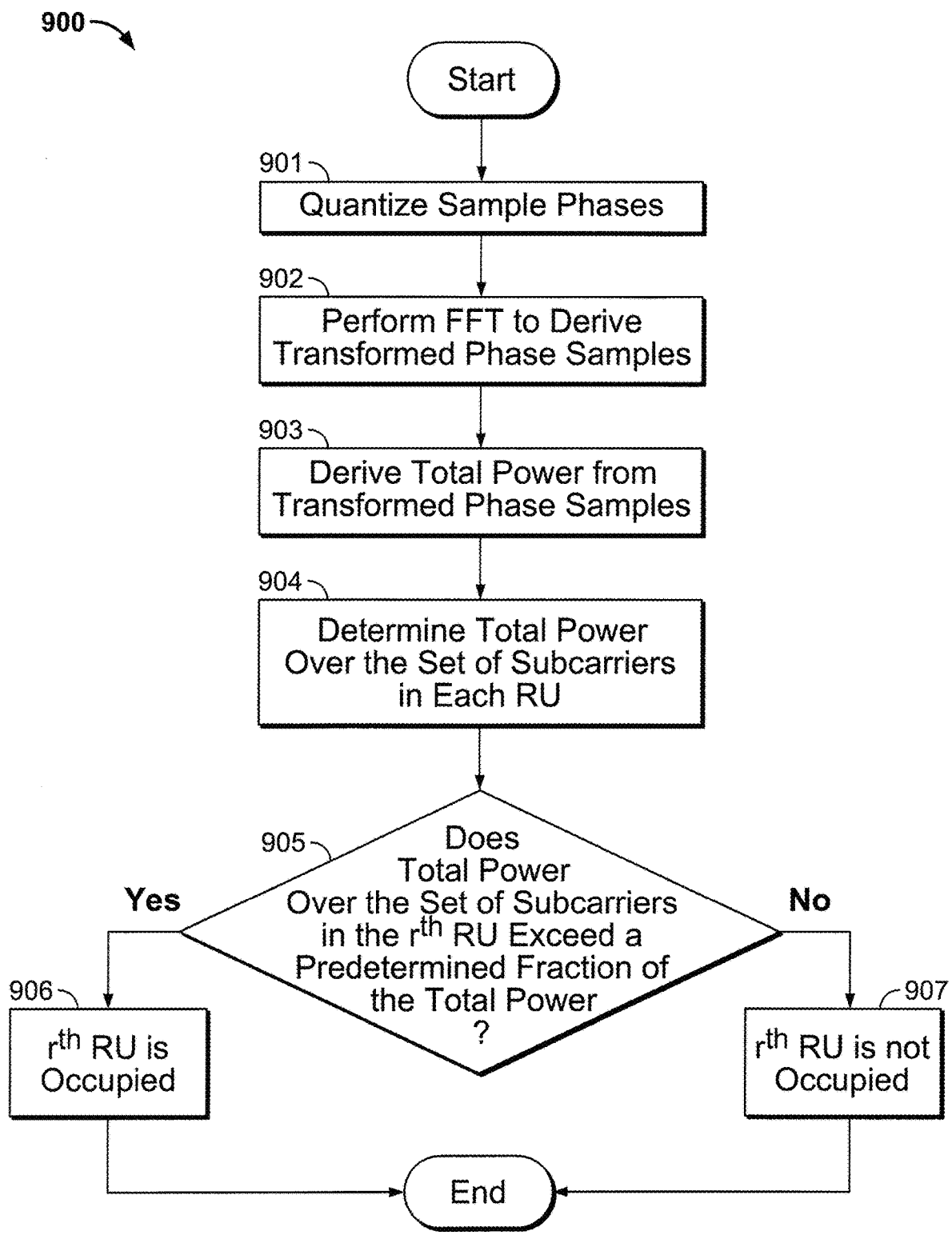
FIG. 9 is a flow diagram of a first method in accordance with implementations of the subject matter of this disclosure for detecting active resource units.

The foregoing first method 900 is diagrammed in FIG. 9. At 901, the phases of the data samples are quantized using any suitable technique, such as that described above in connection with FIGS. 7 and 8. At 902, the quantized samples are transformed using, for example, a Fast Fourier Transform. At 903, the total power is derived from the transformed samples in the manner described above (e.g., using Parseval's Theorem). At 904, for each RU, the total power is similarly derived from the set of subcarriers in that RU. At 905, for each RU, it is determined whether the total power over the set of subcarriers in that RU exceeds a predetermined fraction ($\beta$) of the total power. If so, then at 906 that RU is considered to be occupied or in use and method 900 ends. If at 905 the total power over the set of subcarriers in that RU does not exceed the predetermined fraction of the total power, then at 907 that RU is considered not to be occupied or in use, and method 900 ends.

According to a second method to determine whether the $j^{th}$ RU is occupied with signal (i.e., is in use), the power for each RU assigned in the trigger frame can be computed in dB (or some other logarithmic scale), and then the power in each RU can be compared to the power in the RU with the maximum power. If the power difference between the RU with the maximum power and the RU of interest is below a certain threshold, the RU of interest is considered to be active; otherwise, the RU of interest is considered to be inactive.

Specifically, for each RU assigned in the trigger frame, the power in dB can be determined as follows:

$$P_j = 10\log_{10}\left(\sum_{k \in K_r} |X_k|^2\right)$$

where $P_j$ is the power of the $j^{th}$ and $K_r$ is the set of all subcarriers in the $r^{th}$ RU or only loaded subcarriers in the $r^{th}$ RU. Once all the $P_j$ have been determined, the power $P_{max}$ of the RU with maximum power can be determined:

$$P_{max} = \max P_j, j \in \{1, \ldots, N_{RU}\}$$

where $N_{RU}$ is the total number of RUs assigned in the trigger frame. The power difference $\Delta_j$ can then be computed for each $P_j$:

$$\Delta_j = P_{max} - P_j$$

If $\Delta_j \leq \gamma$, where $\gamma$ is a threshold which can be adjusted and optimized empirically for each RU combination specified in the trigger frame (similarly to the determination of $\beta$ above), the RU of interest is considered to be active; otherwise, the RU of interest is considered to be inactive.

Figure 10:
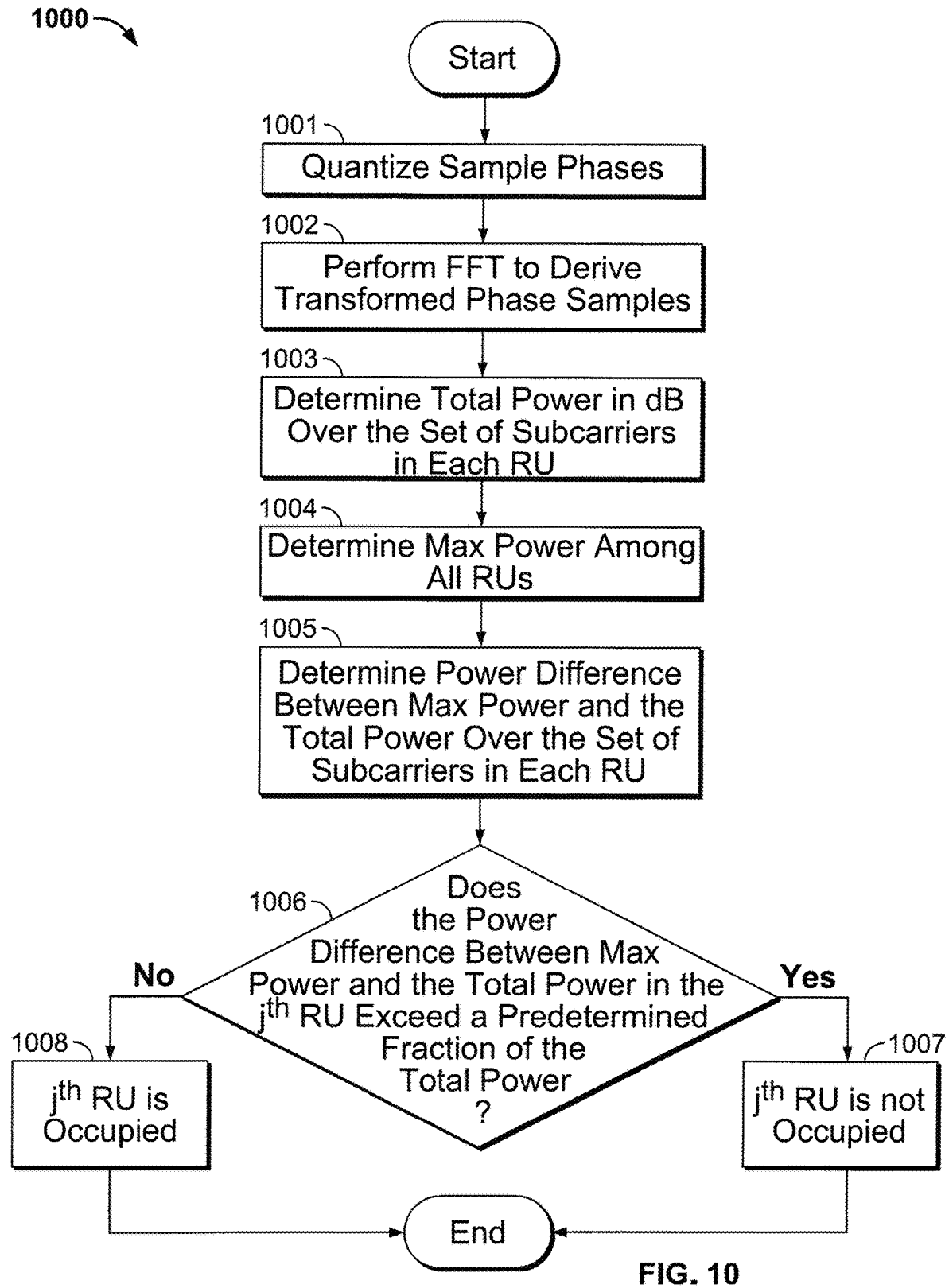
FIG. 10 is a flow diagram of a second method in accordance with implementations of the subject matter of this disclosure for detecting active resource units.

The foregoing second method 1000 is diagrammed in FIG. 10. At 1001, the phases of the data samples are quantized using any suitable technique, such as that described above in connection with FIGS. 7 and 8. At 1002, the quantized samples are transformed using, for example, a Fast Fourier Transform. At 1003, for each RU, the total power is derived from the set of subcarriers in that RU in the manner described above. At 1004, knowing the total power for each RU, the maximum power among all RUs is identified. At 1005, for each RU, the power difference between the maximum power among all RUs, and the power for that RU, is determined. At 1006, for each RU, it is determined whether the power difference between the maximum power among all RUs, and the power for that RU, exceeds a predetermined fraction ($\gamma$) of the maximum power among all RUs. If so, than at 1007 that RU is considered not to be occupied or in use and method 1000 ends. If at 1006 it is determined that the power difference between the maximum power among all RUs, and the power for that RU, does not exceed the predetermined fraction of the maximum power among all RUs, then at 1008 that RU is considered to be occupied or in use, and method 1000 ends.

As a variant of this second method, instead of computing the power differences $\Delta_j$ on a logarithmic scale (such as dB), one can check whether the power $P_j$ of the $j^{th}$ RU on a linear scale (such as mW) exceeds a predetermined fraction, $\delta$, of the power $P_{max}$ of the RU with maximum power:

$$P_j > \delta P_{max}$$

where $\delta$ is a threshold which can be adjusted and optimized empirically for each RU combination specified in the trigger frame (as this variant is similar to second method, the relationship between $\delta$ and $\gamma$ is $\delta = 10^{-\gamma/10}$). If the power $P_j$ of the $j^{th}$ RU exceeds a predetermined fraction, $\delta$, of the power $P_{max}$ of the RU with maximum power, the RU of interest is considered to be active; otherwise, the RU of interest is considered to be inactive.

Figure 11:
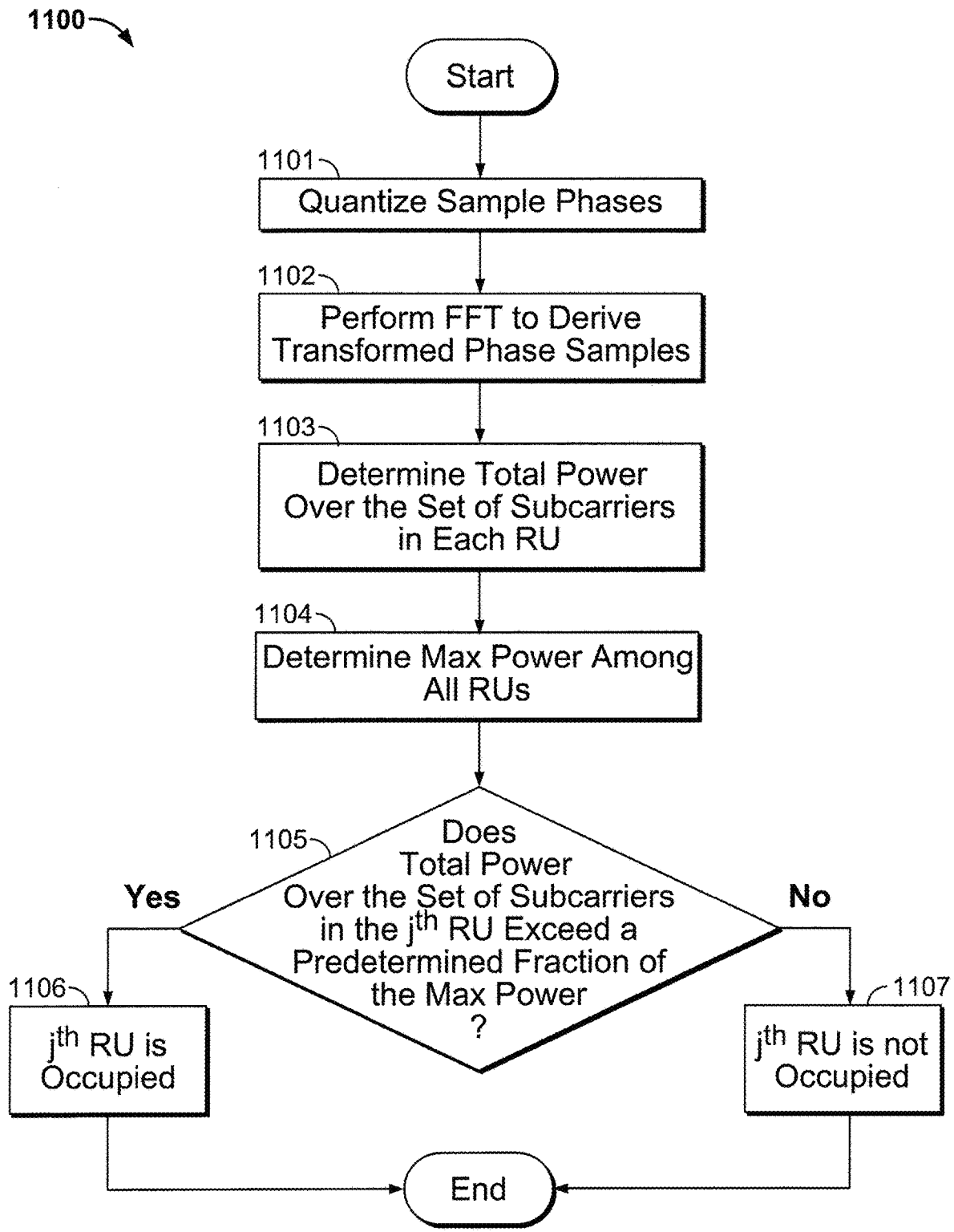
FIG. 11 is a flow diagram of a variant of the second method in accordance with implementations of the subject matter of this disclosure for detecting active resource units.

The foregoing variant 1100 of second method 1000 is diagrammed in FIG. 11. At 1101, the phases of the data samples are quantized using any suitable technique, such as that described above in connection with FIGS. 7 and 8. At 1102, the quantized samples are transformed using, for example, a Fast Fourier Transform. At 1103, for each RU, the total power is derived from the set of subcarriers in that RU in the manner described above. At 1104, knowing the total power for each RU, the maximum power among all RUs is identified. At 1105, for each RU, it is determined whether the total power for the set of subcarriers in that RU exceeds a predetermined fraction (δ) of the maximum power among all RUs. If so, than at 1106 that RU is considered to be occupied or in use and method 1100 ends. If at 1105 it is determined that the total power for the set of subcarriers in that RU does not exceed the predetermined fraction of the maximum power among all RUs, then at 1107 that RU is considered not to be occupied or in use, and method 1100 ends.

The specific implementations described above are only examples. RU detection in accordance with implementations of the subject matter of this disclosure may be used, for example, with subchannels of different bandwidths, such as 40 MHz, 80 MHz, 160 MHz or any other bandwidth. Nor are there any constraints relative to the subject matter of this disclosure on the RU combinations within a given bandwidth, or the on the number of MIMO receive antennas. Further, as noted above, any other angle quantization and PSK constellation methods can be used. And as mentioned, the thresholds α, β, γ, δ may be adjustable. Moreover, while the foregoing examples are presented in the context of UL-OFDMA, there may be situations in which subject matter according to this disclosure would be implemented in the context of DL-OFDMA.

Thus it is seen that methods and apparatus for detection, in a high-efficiency wireless system, of which of the allocated resource units are active, has been provided.

As used herein and in the claims which follow, the construction "one of A and B" shall mean "A or B."

It is noted that the foregoing is only illustrative of the principles of the invention, and that the invention can be practiced by other than the described embodiments, which are presented for purposes of illustration and not of limitation, and the present invention is limited only by the claims which follow.

What is claimed is:

1. A method of identifying an active resource unit in a high-efficiency wireless system, the method comprising:
    receiving samples in a high-efficiency short training field of a transmission, each respective one of the samples being a respective complex number;
    deriving a respective phase angle value for each respective one of the samples from components of the respective complex number;
    quantizing each respective phase angle value to yield a respective quantized phase-only sample;
    performing a transform operation on quantized phase-only samples to derive transmitted power;
    comparing transmitted power of an individual resource unit as determined solely from transformed quantized phase-only samples to transmitted power of other resource units as determined from transformed quantized phase-only samples; and
    identifying, as active, a resource unit whose transmitted power, as determined solely from transformed quantized phase-only samples, bears a first predetermined relationship to transmitted power of the other resource units.

2. The method of claim 1 wherein the comparing transmitted power of the individual resource unit as determined solely from transformed quantized phase-only samples to transmitted power of other resource units as determined solely from transformed quantized phase-only samples comprises comparing the transmitted power of the individual resource unit to the total transmitted power of all resource units.

3. The method of claim 2 wherein the identifying, as active, a resource unit whose transmitted power, as determined solely from transformed quantized phase-only samples, bears the first predetermined relationship to transmitted power of the other resource units, comprises identifying, as active, a resource unit whose transmitted power exceeds a predetermined fraction of the total transmitted power of all resource units.

4. The method of claim 1 wherein the comparing transmitted power of the individual resource unit as determined solely from transformed quantized phase-only samples to transmitted power of other resource units as determined solely from transformed quantized phase-only samples comprises comparing the transmitted power of the individual resource unit to the transmitted power of a particular one of the other resource units.

5. The method of claim 4 wherein the comparing transmitted power of the individual resource unit as determined solely from transformed quantized phase-only samples to transmitted power of other resource units as determined solely from transformed quantized phase-only samples comprises comparing the transmitted power of the individual resource unit to the transmitted power of one of the other resource units whose transmitted power is a maximum transmitted power of all resource units.

6. The method of claim 5 wherein:
    the comparing the transmitted power of the individual resource unit to the transmitted power of one of the other resource units whose transmitted power is a maximum transmitted power of all resource units, comprises determining a difference between the transmitted power of the one of the other resource units whose transmitted power is the maximum transmitted power of all resource units, and the transmitted power of the individual resource unit; and
    the identifying, as active, a resource unit whose transmitted power, as determined solely from transformed quantized phase-only samples, bears the first predetermined relationship to transmitted power of the other resource units, comprises identifying, as active, a resource unit for which the difference at most equals a threshold.

7. The method of claim 5 wherein the identifying, as active, a resource unit whose transmitted power, as determined solely from transformed quantized phase-only samples, bears the first predetermined relationship to transmitted power of the other resource units, comprises identifying, as active, a resource unit whose transmitted power, as determined solely from transformed quantized phase-only samples, exceeds a predetermined fraction of the transmitted power of the one of the other resource units whose transmitted power is the maximum transmitted power of all resource units.

8. The method of claim 1 further comprising:
    identifying, as inactive, a resource unit whose transmitted power, as determined solely from transformed quantized phase-only samples, bears a second predetermined relationship to transmitted power of the other resource units; and deactivating operations on a resource unit that has been identified as inactive.

9. The method of claim 8 wherein:

the comparing transmitted power of the individual resource unit as determined solely from transformed quantized phase-only samples to transmitted power of other resource units as determined solely from transformed quantized phase-only samples comprises comparing the transmitted power of the individual resource unit to the total transmitted power of all resource units; and the identifying, as inactive, a resource unit whose transmitted power, as determined solely from transformed quantized phase-only samples, bears the second predetermined relationship to transmitted power of the other resource units, comprises identifying, as inactive, a resource unit whose transmitted power at most equals a predetermined fraction of the total transmitted power of all resource units.

10. The method of claim 8 wherein:

the comparing transmitted power of an individual resource unit as determined solely from transformed quantized phase-only samples to transmitted power of other resource units as determined solely from transformed quantized phase-only samples comprises comparing the transmitted power of the individual resource unit to the transmitted power of a particular one of the other resource units whose transmitted power is a maximum transmitted power of all resource units; and the identifying, as inactive, a resource unit whose transmitted power, as determined solely from transformed quantized phase-only samples, bears the second predetermined relationship to transmitted power of the other resource units, comprises identifying, as inactive, a resource unit whose transmitted power bears the second predetermined relationship to the transmitted power of the particular one of the other resource units whose transmitted power is a maximum transmitted power of all resource units.

11. The method of claim 10 wherein:

the comparing the transmitted power of the individual resource unit to the transmitted power of the particular one of the other resource units whose transmitted power is a maximum transmitted power of all resource units comprises determining a difference between the transmitted power of the one of the other resource units whose transmitted power is the maximum transmitted power of all resource units, and the transmitted power of the individual resource unit; and the identifying, as inactive, a resource unit whose transmitted power, as determined solely from transformed quantized phase-only samples, bears the second predetermined relationship to transmitted power of the other resource units, comprises identifying, as inactive, a resource unit for which the difference exceeds a threshold.

12. The method of claim 10 wherein:

the identifying, as inactive, a resource unit whose transmitted power, as determined solely from transformed quantized phase-only samples, bears the second predetermined relationship to the transmitted power of the particular one of the other resource units whose transmitted power is a maximum transmitted power of all resource units, comprises identifying, as inactive, a resource unit whose transmitted power at most equals a predetermined fraction of the transmitted power of the one of the other resource units whose transmitted power is the maximum transmitted power of all resource units.

13. The method of claim 1 wherein the transmission is a UL-OFDMA transmission.

14. The method of claim 1 wherein the transmission is a DL-OFDMA transmission.

15. A receiver for a high-efficiency wireless system, the receiver comprising a controller configured to identify an active resource unit in the high-efficiency wireless system, by:

receiving samples in a high-efficiency short training field of a transmission, each respective one of the samples being a respective complex number;

deriving a respective phase angle value for each respective one of the samples from components of the respective complex number;

quantizing each respective phase angle value to yield a respective quantized phase-only sample;

performing a transform operation on quantized phase-only samples to derive transmitted power;

comparing transmitted power of an individual resource unit as determined solely from transformed quantized phase-only samples to transmitted power of other resource units as determined from transformed quantized phase-only samples; and identifying, as active, a resource unit whose transmitted power, as determined solely from transformed quantized phase-only samples, bears a first predetermined relationship to transmitted power of the other resource units.

16. The receiver of claim 15 wherein the controller is configured to compare the transmitted power of the individual resource unit as determined solely from transformed quantized phase-only samples to total transmitted power of all resource units as determined solely from transformed quantized phase-only samples.

17. The receiver of claim 16 wherein the controller is configured to identify, as active, a resource unit whose transmitted power, as determined solely from transformed quantized phase-only samples, exceeds a predetermined fraction of the total transmitted power of all resource units.

18. The receiver of claim 15 wherein the controller is configured to compare transmitted power of an individual resource unit as determined solely from transformed quantized phase-only samples to transmitted power of a particular one of the other resource units.

19. The receiver of claim 18 wherein the controller is configured to compare transmitted power of an individual resource unit as determined solely from transformed quantized phase-only samples to transmitted power of one of the other resource units whose transmitted power is a maximum transmitted power of all resource units.

20. The receiver of claim 19 wherein the controller is configured to:

compare the transmitted power of the individual resource unit to the transmitted power of one of the other resource units whose transmitted power is a maximum transmitted power of all resource units, by determining a difference between the transmitted power of the one of the other resource units whose transmitted power is the maximum transmitted power of all resource units, and the transmitted power of the individual resource unit; and identify, as active, a resource unit for which the difference at most equals a threshold.

21. The receiver of claim 19 wherein the controller is configured to identify, as active, a resource unit whose transmitted power, as determined solely from transformed quantized phase-only samples, exceeds a predetermined fraction of the transmitted power of the one of the other resource units whose transmitted power is the maximum transmitted power of all resource units.

22. The receiver of claim 15 wherein the controller is further configured to:
identify, as inactive, a resource unit whose transmitted power, as determined solely from transformed quantized phase-only samples, bears a second predetermined relationship to transmitted power of the other resource units; and
deactivate operations on a resource unit that has been identified as inactive.

\* \* \* \* \*